US012356208B2

(12) United States Patent
Ye et al.

(10) Patent No.: US 12,356,208 B2
(45) Date of Patent: Jul. 8, 2025

(54) BEAMFORMING OPTIMIZATION TO ADAPT TO ENVIRONMENTAL CHANGES AND RF CONSUMPTION PATTERNS

(71) Applicant: DELL PRODUCTS L.P., Round Rock, TX (US)

(72) Inventors: Qing Ye, Hopkinton, MA (US); Rowland Shaw, Chester, NH (US)

(73) Assignee: Dell Products L.P., Round Rock, TX (US)

( * ) Notice: Subject to any disclaimer, the term of this patent is extended or adjusted under 35 U.S.C. 154(b) by 196 days.

(21) Appl. No.: 18/187,903

(22) Filed: Mar. 22, 2023

(65) Prior Publication Data

US 2023/0319584 A1 Oct. 5, 2023

Related U.S. Application Data

(63) Continuation-in-part of application No. 17/711,531, filed on Apr. 1, 2022, and a continuation-in-part of application No. 17/711,577, filed on Apr. 1, 2022, now Pat. No. 12,154,223.

(51) Int. Cl.
*H04W 16/18* (2009.01)
*G06T 17/05* (2011.01)
*H04W 16/04* (2009.01)

(52) U.S. Cl.
CPC ............ *H04W 16/18* (2013.01); *G06T 17/05* (2013.01); *H04W 16/04* (2013.01)

(58) Field of Classification Search
None
See application file for complete search history.

(56) References Cited

U.S. PATENT DOCUMENTS

| 5,706,281 A * | 1/1998 | Hashimoto | H04L 12/6418 370/465 |
| 8,423,033 B1 * | 4/2013 | Everson | H04W 28/20 455/445 |
| 8,639,212 B1 | 1/2014 | Sennett et al. | |
| 9,072,092 B1 * | 6/2015 | Gunasekara | H04L 45/02 |
| 10,634,503 B2 * | 4/2020 | Hill | G06Q 10/04 |
| 2022/0272794 A1 * | 8/2022 | Aftab | H04W 28/0289 |

FOREIGN PATENT DOCUMENTS

JP  WO 2008/149403  * 12/2008  ............... H04Q 7/36

* cited by examiner

*Primary Examiner* — Kenneth B Wells
(74) *Attorney, Agent, or Firm* — Larson Newman, LLP

(57) ABSTRACT

A data communication network includes data communication nodes configured to establish data connections with user equipment devices within an RF coverage area, imaging devices configured to provide image information for the RF coverage area, and an information handling system. The information handling system receives RF coverage information from the data communication nodes, receives first image information from the imaging devices, determines a first RF coverage map for the RF coverage area based upon the RF coverage information and the image information, provides a first bandwidth allocation to the data communication nodes based on the first RF coverage map, receives second image information from the imaging devices, determines that the first RF coverage map has changed to a second RF coverage map based upon a difference between the first image information and the second image information, and provides a second bandwidth allocation to the data communication nodes based on the second RF coverage map.

20 Claims, 5 Drawing Sheets

BEAMFORMING OPTIMIZATION TO ADAPT TO ENVIRONMENTAL CHANGES AND RF CONSUMPTION PATTERNS

CROSS-REFERENCE TO RELATED APPLICATIONS

This application is a Continuation-in-part of U.S. patent application Ser. No. 17/711,531 entitled "REAL-TIME 3D LOCATION SERVICE FOR DETERMINISTIC RF SIGNAL DELIVERY," filed Apr. 1, 2022 and U.S. patent application Ser. No. 17/711,577 entitled "REAL-TIME 3D TOPOLOGY MAPPING FOR DETERMINISTIC RF SIGNAL DELIVERY," filed Apr. 1, 2022, now U.S. Pat. No. 12,154,223, Issued Nov. 26, 2024, the disclosure of which is hereby expressly incorporated by reference in its entirety.

Related subject matter is contained in U.S. patent application Ser. No. 18/187,944 entitled "PATTERN LEARNING TO ELIMINATE REPETITIVE COMPUTE OPERATIONS IN A DATA COMMUNICATION NETWORK," filed Mar. 22, 2023, the disclosure of which is hereby incorporated by reference.

FIELD OF THE DISCLOSURE

This disclosure generally relates to communication systems, and more particularly relates to beamforming optimization to adapt to environmental changes and RF consumption patterns.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A data communication network may include data communication nodes configured to establish data connections with user equipment devices within an RF coverage area, imaging devices configured to provide image information for the RF coverage area, and an information handling system. The information handling system may receive RF coverage information from the data communication nodes, receive first image information from the imaging devices, determine a first RF coverage map for the RF coverage area based upon the RF coverage information and the image information, provide a first bandwidth allocation to the data communication nodes based on the first RF coverage map, receive second image information from the imaging devices, determine that the first RF coverage map has changed to a second RF coverage map based upon a difference between the first image information and the second image information, and provide a second bandwidth allocation to the data communication nodes based on the second RF coverage map.

BRIEF DESCRIPTION OF THE DRAWINGS

It will be appreciated that for simplicity and clarity of illustration, elements illustrated in the FIGS. have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the FIGS. is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
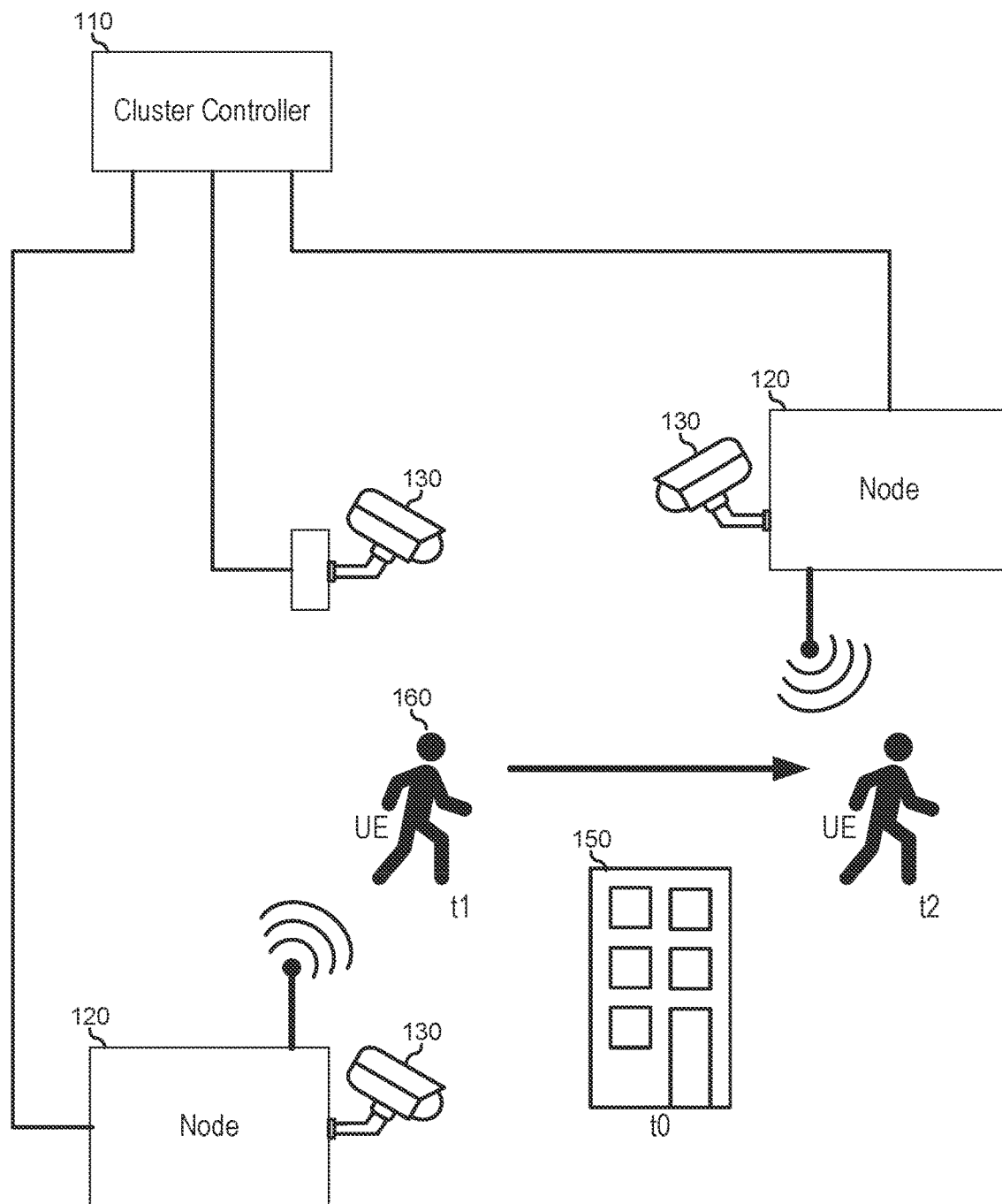
FIG. 1 is an illustration of a data communication network according to an embodiment of the current disclosure.

FIG. 1 illustrates a data communication network 100, including a cluster controller 110, one or more data communication nodes 120, and one or more imaging devices 130. Data communication network 100 represents a distributed communication network, such as a cellular network for communicating with a distributed set of user equipment (UE) 160. For example, data communication network 100 may represent a fifth generation (5G) cellular network, a WiFi network, a wireless Wide Area Network (WAN), another type of data communication network, or the like. UE 160 may represent 5G enabled mobile cellular devices, Internet-of-Things (IoT) devices, machine-to-machine interconnected devices, or the like. In a particular embodiment data communication nodes 120 represent cellular communication nodes, and may be operated, managed, and maintained in conformance with a particular cellular infrastructure standard, such as the Common Public Radio Interface (CPRI) standard, where the data communication nodes include Radio Equipment (RE) components configured to provide wireless data communications in accordance with a particular wireless data protocol, and Radio Equipment Control (REC) components configured to control the RE and to provide connectivity to the broader cellular data network infrastructure.

The details of data communication over a data communication network, and particularly the wireless communication over, for example, a cellular data communication network are known in the art and will not be described further herein, except as needed to illustrate the current embodiments. UE 160 may represent any device that is configured to communicate within data communication network 100, and particularly with nodes 120. For example, UE 160 may include a cell phone, a tablet device, a computer device such as a laptop computer or a desktop computer, a mobile device such as a vehicle-based communication system, an IoT device, or the like.

Nodes 120 are each connected to cluster controller 110. Cluster controller 110 operates to provide monitoring, management, and maintenance services to nodes 120, as needed or desired. Cluster controller 110 may be understood to be provided at a location that is proximate to nodes 120, or may be understood to be provided at a central location for data communication network 100, such as a data center associated with the data communication network, and the functions and features of the cluster controller may be performed by a single common information handling system, or by one or more distributed information handling systems, as needed or desired. The monitoring, management, and maintenance of data communication networks are known in the art and will not be described further herein, except as needed to illustrate the current embodiments.

Data communication network 100 is configured such that one or more of nodes 120 include integrated or stand-alone imaging devices 130. Data communication network 100 is further configured to include one or more additional imaging device 130 that are not directly associated with a particular node, but operate in a stand-alone capacity. Whether associated with a node, or operating as a stand-alone device, imaging devices 130 represent devices that are located and configured to provide still picture and video monitoring of an RF coverage area of data communication network 100. Imaging devices 130 may include visual light detection devices, invisible light detection devices such as infrared cameras, lidar systems, and the like, radar imaging devices, or the like, sound imaging devices, or other types of devices which may be utilized to generate topological information, as described below. In either case, cluster controller 110 operates to provide monitoring, management, and maintenance services to imaging devices 130, as needed or desired.

In a particular embodiment, cluster controller 110 operates to receive image information from the field of view of imaging devices 130, and RF coverage information from nodes 120. Cluster controller 110 utilizes the image information and the RF coverage information to synthesize a three-dimensional (3D) map of the physical topology of the RF coverage area of data communication network 100. Cluster controller 110 then correlates the connection status for nodes 120 with the various components of UE 160 that are connected to data communication network 100 within the field of view of each of the imaging devices with the 3D map of the physical topology of the RF coverage area. In particular, cluster controller 110 determines when a particular component of UE 160 experiences a diminished or dropped connection, and correlates the locations where the UE experiences the diminished or dropped connections with the 3D map of the physical topology of the RF coverage area. In this way, cluster controller 110 operates to identify features 150 within the 3D map of the physical topology of the RF coverage area that may attenuate or block the connection between a particular node 120 and UE 160. An example of rendering a 3D map of the physical topology may include correlating multiple imaging inputs 210 utilizing a Neural Radiant Field (NeRF) algorithm, a Structure from Motion (SfM) algorithm, or the like.

For example, cluster controller 110 may operate to determine that a particular node 120 has no current connections with a UE 160, and to correlate the image information provided by imaging devices 130 within the RF coverage area of that node, including any imaging device associated with the node and any imaging device that is a stand-alone imaging device that has a field of view that covers the RF coverage area of the node. In this way, cluster controller 110 can synthesize a 3D map of the RF coverage area of each of nodes 120 into a 3D map of features 150 within the RF coverage area of data communication network 100.

When a particular component of UE 160 is connected to particular node 120, such a connection will be maintained by the node until such time as the connection is interrupted, for example by the UE moving out of range of the node or entering a coverage dead zone for the node. However, nodes 120 typically are not aware of when a connection is lost, and when a component of UE 160 loses coverage, the UE will typically initiate a process to initiate other connection options with a first node 120, or to establish a new connection with another node 120. That is, the connection of UE 160 with nodes 120 is typically reactive from the perspective of the nodes. However, such a reactive approach may lead to poor performance from the perspective of UE 160 due to the poor link performance between the detection of the loss of connection with a first node 120 and the establishment of a new connection with a second node 120.

In establishing and maintaining the connection between a node 120 and a component of UE 160, a typical node in a data communication network will provide the communication signals to the UE utilizing a multiple-input/multiple-output (MIMO) antenna array, and will attempt to provide the communication signals by beamforming the signals with the antenna array to maximize the received signal strength by the UE while also minimizing the power output of the communication signal by the node. A node may employ various algorithms, along with feedback from the UE to shift the beamforming activities to maintain an optimal signal between the node and the UE. The details of establishing, maintaining, and optimizing data communication connections between nodes of a data communication network and the UE within the data communication network are known in the art and will not be described further herein, except as needed to illustrate the current embodiments.

In a particular embodiment, cluster controller 110 operates to correlate the image information from imaging devices 130 with the beamforming information from nodes 120 to identify and manage the targets of the connections between the nodes and the various UE 160 within the RF coverage area of the nodes and data communication network 100. Cluster controller 110 further utilizes motion information to predict the future motion of UE 160 within data communication network 100.

Cluster controller 110 operates to proactively direct the node 120 associated with a particular component of UE 160 to provide beamforming parameters to improve the communication signal to the UE and to improve the efficiency of the node in delivering communication signals to the UE. Moreover, utilizing the 3D map of the RF coverage areas of nodes 120, cluster controller 110 operates to predict when a component of UE 160 will enter a particular node's dead or highly attenuated zone, and to proactively hand off communications with that UE by another node that has a suitable RF path to that UE. In this way, degradation in connectivity between the components of UE 160 and data communication network 100 can be improved, and the user may not experience disruptions in coverage, as data communication network 100 actively manages the connections between nodes 120 and UE 160 by altering the beamforming parameters.

In another embodiment, cluster controller 110 operates to proactively allocate data bandwidth between nodes 120 based upon spatial insights from the visual information. For example, if the RF coverage area of a particular node 120 is seen to be sparsely populated with UE 160, and another node is seen to be heavily populated with UE, cluster controller 110 can operate to allocate more data bandwidth to the heavily populated node if there remains a line of sight to direct the RF beam to the UEs associated with the heavily populated node. Moreover, based upon historical information, future bandwidth may be prepared for other nodes 120 within data communication network 100. For example, consider an event venue that is emptying out after an event. It may be understood that the UE 160 associated with the event-goers may be expected to move from the event venue to nearby parking structures and on to adjacent roadways, and cluster controller 110 can operate to shift the backend data bandwidth to the core network between the associated nodes 120 near the venue, the parking structures, and the adjacent roadways to meet the anticipated usage pattern. In another embodiment, cluster controller 110 operates to correlate the users' of particular UE 160 with their associated service level agreements (SLAs), and to allocate data bandwidth with the UE accordingly.

In a particular embodiment, cluster controller 110 utilizes artificial intelligence/machine learning (AI/ML) algorithms to analyze the image information to monitor and maintain the 3D map. For example, while features 150 may typically be understood to represent fixed features, such as buildings or other fixed signal obstructions, utilizing AI/ML algorithms, cluster controller 110 may add real-time RF path obstructions to the 3D map of the RF coverage area of nodes 120. Consider a large mobile obstruction, such as a bus or large truck, moving through a particular node's 120 RF coverage area. Cluster controller 110 may operate to improve the real-time maintenance of connectivity, such as dead zone detection, rapidly changing RF environment, and beamforming activities, to better account for the mobile obstruction to the RF paths. It may be further understood that other real-time RF path obstructions may be identified, such as human bodies or animals within the 3D map. Further, utilizing the AI/ML algorithms, cluster controller 110 can operate to predict processing needs for the RF coverage area of nodes 120, and increase or decrease backend processing capacity to meet the changing demand profile.

As described herein, the functions and features of cluster controller 110 may be instantiated in hardware, in software or code, or in a combination of hardware and code configured to perform the described functions and features. Moreover, the functions and features may be provided at a single location or by a single device, such as an information handling system, or may be provided at two or more locations by two or more devices, such as by two or more information handling systems. One or more of the functions and features as described herein may be each performed by a different information handling system, and any particular function or feature may be distributed across two or more information handling systems, as needed or desired. Further, as described herein, the functions and features of cluster controller 110 may be understood to be provided at any network level as needed or desired.

For example, where data communication network 100 includes separate groups of nodes 120, where each group of nodes is routed through a common access switch, where the data flows from separate groups of access switches are aggregated by a common aggregator, where the processing demands of groups of aggregators are processed by a core data processing network, then the functions and features of cluster controller 110 may be provided by one or more of the access switches, the aggregators, or the core network, as needed or desired. As such, it may be deemed desirable to perform map synthesis at the core network, where access times are typically longer, but data processing capacities are typically greater, whereas it may be deemed desirable to perform UE motion tracking and connection hand-offs at a processing level that is closer to the nodes, where access times are typically shorter.

Figure 2:
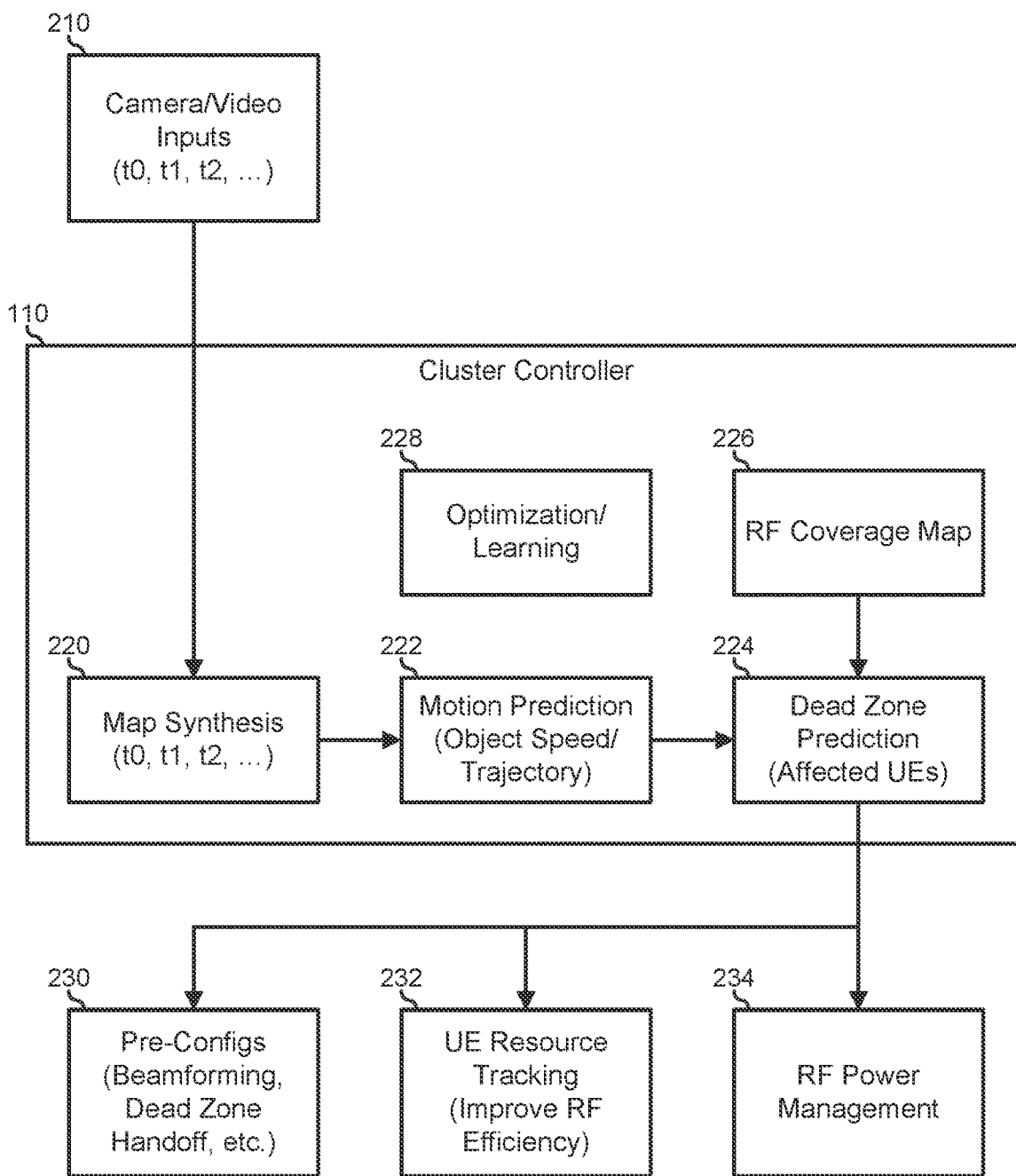
FIG. 2 is a block diagram illustrating a cluster controller of the data communication network of FIG. 1.

FIG. 2 illustrates cluster controller 110 in greater detail. Cluster controller 110 is configured to receive imaging inputs 210 from imaging devices 130. Cluster controller 110 operates to process the imaging inputs and to control the operations of nodes in data communication network 100 including nodes 120. Cluster controller 110 further operates to provide the nodes with pre-configurations 230, resource tracking 232 of UEs within data communication network 100 including UE 160, and RF power management 234 for the nodes.

Imaging inputs 210 represent the output from imaging devices 130, and may include any still or motion imaging format as may be known in the art, including proprietary still or motion imaging formats. Where a particular imaging device 130 is configured to still images (that is, a camera device), the images will be understood to be received by cluster controller based upon various time stamps (t0, t1, t2, . . . ) that are associated with a real-time at which the still images were captured. Still image imaging devices 130 may be configured to capture images on a predetermined time schedule, such as once every five or ten seconds, or may be configured to capture images based upon various inputs to the imaging device, such as based upon a motion sensor or the like. Video image imaging devices may be configured to provide continuous stream video images or may be configured to provide video images based upon the various time stamps (t0, t1, t2, . . . ). Imaging devices 130 may be configured to capture images within the visible light spectrum, within the near-visible light spectrum, or at other non-visible light spectrums as needed or desired.

Cluster controller 110 includes a map synthesis module 220, a motion prediction module 222, a dead zone prediction module 224, an RF coverage map module 226, and an optimization/learning module 228. Map synthesis module 220 receives imaging inputs 210 and synthesizes a 3D map of the RF coverage area of data communication network 100 as described above. Here it will be understood that inputs from two or more imaging devices 130 will be utilized to synthesize the 3D map of the RF coverage area of data communication network 100, and that the more imaging device inputs that are received by cluster controller 110, the better and more accurate will be the 3D map synthesized by map synthesis module 220. Cluster controller 110 further receives coverage information from nodes 120. For example, cluster controller 110 may receive RF signal intensity maps 226 for the RF coverage areas associated with each node 120, including default beamforming settings, coverage angles, RF signal power settings, and the like. Here, dead zone prediction module 224 operates to correlate the synthesized 3D map with the received coverage information to generate a baseline RF coverage map that predicts the presence of features 150 that are understood to present obstacles that attenuate the RF signals between nodes 120 and UE 160.

In a particular embodiment, the baseline RF coverage map is synthesized based upon real-time information from imaging devices 130. In particular, it will be understood that a particular RF coverage area for a particular node 120 may be constantly populated by one or more UEs 160, and other objects within the field of view of imaging devices 130 that may make the generation of the baseline RF coverage map difficult. However, here, map synthesis module 220 may utilize optimization/learning module 228 to create the baseline RF coverage map for the hypothetical situation where the RF coverage area is empty of UEs 160 and other objects based upon learned responses from the RF coverage area. Further, map synthesis module 220 operates to periodically update the baseline RF coverage map based upon the changing conditions within the RF coverage area. For example, where an RF coverage area represents an event venue, the presence of moving vans in a loading area may represent temporary obstructions within the coverage area of nodes 120 within line of sight of the loading area. Or, where an RF coverage area represents an office space, a reorganization of cubicles within the office space may militate for an updated coverage map for the office area.

Cluster controller 110 further utilizes artificial intelligence/machine learning (AI/ML) algorithms embodied in optimization/learning module 228 to analyze the image information to monitor and maintain the baseline RF coverage map. For example, while features 150 may typically be understood to represent fixed or semi-permanent features, such as buildings, parked vehicles, or other fixed signal obstructions, utilizing AI/ML algorithms, cluster controller 110 may add real-time RF path obstructions to the baseline RF coverage map of the RF coverage area of nodes 120. Consider a large mobile obstruction, such as a bus or large truck, moving through a particular node's 120 RF coverage area. Cluster controller 110 may operate to improve the real-time maintenance of connectivity, such as dead zone detection, rapidly changing RF environment, and beamforming activities, to better account for the mobile obstruction to the RF paths. Further, utilizing the AI/ML algorithms, cluster controller 110 can operate to predict processing needs for the RF coverage area of nodes 120, and increase or decrease backend processing capacity to meet the changing demand profile.

This baseline RF coverage map can be utilized in conjunction with the motion of objects within the RF coverage area as determined by motion prediction module 222. As such the movement of vehicles, people, and the like, through the RF coverage area can be predicted. Movement detection module 222 further operates to identify the speed and trajectory of the objects, and can thereby distinguish between people and vehicles or other objects within the RF coverage area. Then, based upon the map information from map synthesis module 220 and the object and motion information from object detection module 222, dead zone prediction module 224 operates to predict coverage dead zones for each of nodes 120. The dead zones can be combined with information from a pre-determined RF coverage map module 226 to predict the real-time dead zones for each of nodes 120.

Returning to motion prediction module 222, the movement of objects through the RF coverage areas of nodes 120 is combined with information related to each node's beamforming status for the UEs 160 in the RF coverage area. Motion prediction module 222 further operates to identify objects that are within the RF coverage area of each node 120 that are associated with users of UE 160, and the users' speeds and trajectories. Dead zone prediction module 224 further operates to correlate the movements of UEs 160 with the identified dead zones to determine in advance when a particular UE is expected to lose connection with a particular node 120, and further operates to determine a next best node to pass the UE to. Optimization/learning module 228 utilizes various AI/ML algorithms to better predict the emergence of signal blocking obstructions and the expected motions of the users of the connected UEs 160. Cluster controller 110 finally operates to direct the activities of nodes 120 to proactively maintain an optimum connection status for the UEs within the RF coverage area of data communication network 100, through the implementation of pre-configurations 230, UE resource tracking 232, and RF power management of the nodes, as described above.

Figure 4:
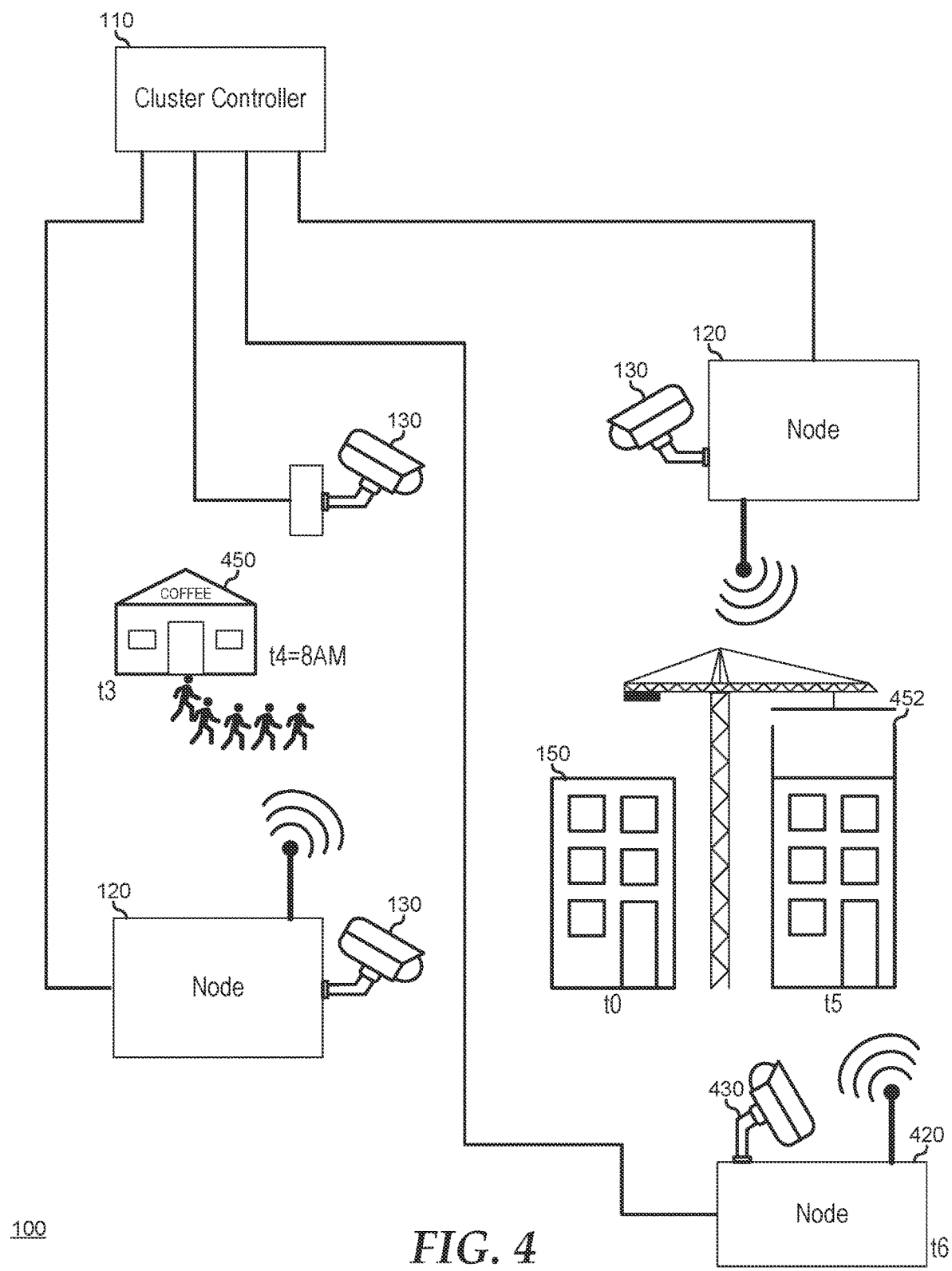
FIG. 4 is an illustration of the data communication network of FIG. 1.

FIG. 4 illustrates data communication network 100 at a later time than is illustrated in FIG. 1. At a time stamp (t3) a new feature 450 is detected within the RF coverage area, and cluster controller 110 synthesizes a modified baseline RF coverage map of the RF coverage area of nodes 120 based upon a newly determined image data from imaging devices 130, as described above. Further, cluster controller 110 operates to calculate the spatial distribution of the effective RF signal intensity based upon the attenuation from feature 450 and determines a new baseline RF coverage map for the RF coverage area.

In addition to determining the new baseline RF coverage map for the RF coverage area based upon feature 450, cluster controller 110 operates to provide modified beamforming settings to nodes 120 to achieve a least-attenuation RF coverage within the RF coverage area based on the new baseline RF coverage map to account for the attenuation provided from the new feature. Further, cluster controller 110 operates to determine usage patterns within the RF coverage area based upon the new baseline RF coverage map. For example, where feature 450 represents a business establishment, such as a coffee shop, cluster controller 110 can determine usage patterns of UEs within the RF coverage area, such as to anticipate a "morning rush" at the coffee shop at a time stamp (t4), or where the feature represents an office building, and the cluster controller can determine morning incoming, and evening outgoing usage patterns of the UEs. Further, cluster controller 110 operates to provide time-based modifications to the beamforming settings to nodes 120 to account for the usage patterns of the UEs, thereby reducing the power consumption within data communication network 100 during times of lower usage, and resolving data bandwidth congestion during times of higher usage.

At a later time stamp (t5) another new feature 452 is detected as being constructed within the RF coverage area, and cluster controller 110 synthesizes a newly modified baseline RF coverage map of the RF coverage area of nodes 120 based upon the newly determined image data from imaging devices 130. Cluster controller 110 further provides newly modified beamforming settings to nodes 120, determines the usage patterns of UEs within the modified baseline RF coverage map, and provides time-based modifications to the beamforming settings to the nodes. Moreover, because feature 452, representing for example a new office building, may be expected to result in additional UEs operating within the RF coverage area, cluster controller 110 operates to recommend the addition of a new node 420 and a new imaging device 430 to provide additional RF coverage and extending the RF coverage area to include feature 452.

In synthesizing the modified baseline RF coverage maps, cluster controller 110 may operate to periodically resynthesize the baseline RF coverage map, such as on a daily basis. Cluster controller 110 may determine a time when UE usage of data communication network 100 is low, such as in the early morning hours when vehicle and pedestrian traffic is at a minimum, in order that the imaging data represents mostly features 150, 450, and 452. In another case, cluster controller 110 may operate to implement a volumetric change threshold, such that, when the cluster controller detects that features within the baseline RF coverage map have changed by an amount greater than the volumetric change threshold, the change triggers a resynthesis of the baseline RF coverage map. In either case, the addition or removal of features within the RF coverage area can easily be accounted for in the newly synthesized baseline RF coverage map.

Figure 5:
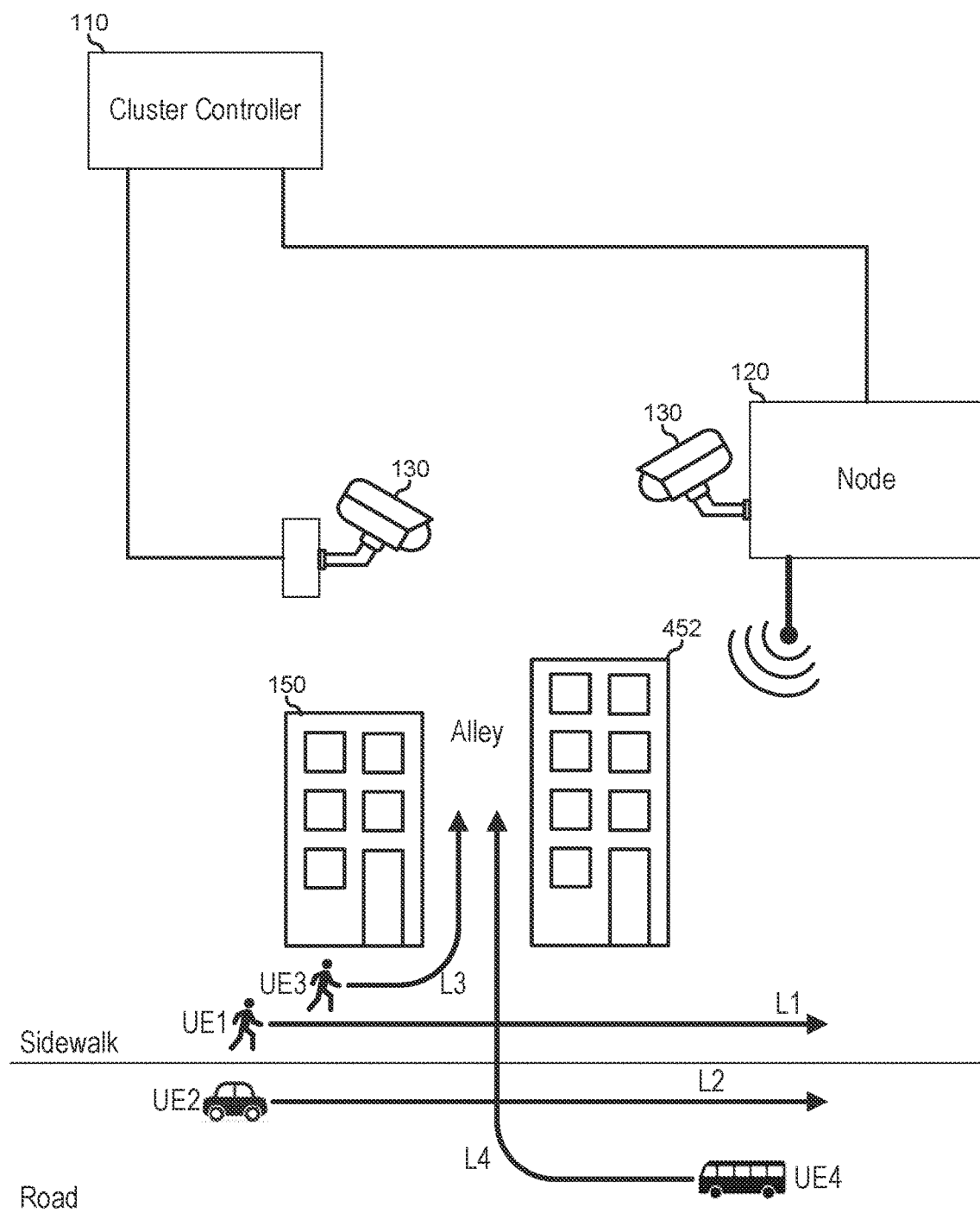
FIG. 5 is another illustration of the data communication network of FIG. 1.

FIG. 5 illustrates data communication network 100 in accordance with a particular embodiment of the current disclosure. In accordance with the various embodiments described herein, cluster controller 110 operates to direct the beamforming activities of nodes 120 to target UEs 160 for deterministic signal delivery. As such, cluster controller 110 operates to compute and analyze the trajectories of UEs 160 operating within the RF coverage area and to orchestrate the beam configurations and the smooth hand off of the various UEs between nodes 120.

It has been understood by the inventors of the current disclosure that the movement of each UE 160 within the RF coverage area is unique, such as by starting at different locations, traveling at different speeds, taking different paths, or the like. It has been further understood that the movement of UEs 160 may be categorized into a relatively few predictive modes that can be ascribed to the UEs. For example, pedestrians will typically be understood to walk on walkways in a relatively straight path in one of two major directions (such as up the walkway or down the walkway), and that the major difference between pedestrians will typically relate to their speed (such as browsing, walking, running, etc.) As such, the beamforming settings for each node-UE connection may be understood to be highly predictable, and may not necessitate extensive analysis by cluster controller to predict the likely path or speed. Moreover given a particular UE's speed, the location of the hand-off point may be easily determined.

Because the movement of the UEs is typically linear, once cluster controller 110 determines a best fit algorithm for the movement of the UEs, the cluster controller can offload the best fit algorithm to processing nodes that are closer to the RF coverage area. That is, cluster controller 110 may represent a back-end functionality of data communication network 100. Data communication network 100 may include additional processing nodes between the cluster controller and nodes 120. In this case, the back-end processing capabilities of cluster controller 110 may be best utilized by providing AI/ML analyses of the motion of UEs 160 within the RF coverage area to find the best fit beamforming algorithms, and then passing those algorithms to processing nodes closer to nodes 120 for directing the actual beamforming activities of the nodes.

In another embodiment, optimization/learning module 228 trains the AI/ML algorithms based upon the behavior of multiple UEs and the associated hand offs between nodes 120. Optimization/learning module 228 operates to recognize trajectories of various UEs, and the volume inhabited by the UEs or clusters of UEs. For example, optimization/learning module 228 may operate to distinguish between single-point UEs, such as pedestrians which may inhabit a volume of 0.5-1.5m3, or delivery trucks which may inhabit a volume of 10-30m3, multiple-point UEs, such as buses that represent an aggregate number of UEs that all have a common trajectory and which may inhabit a volume of 10-20m3, or the like. Cluster controller 110 operates to determine optimal hand off locations, the associated beamforming settings, and the like. Further, cluster controller 110 operates to select optimal nodes 120 to receive the hand offs based upon the data traffic being handled by each node. For example, where a bus full of UEs would normally be handed off to a particular node 120, cluster controller 110 may determine that the particular node is currently experiencing heavier bandwidth usage, and so the cluster controller can select a different node with greater available bandwidth to hand the UEs off to.

It will be understood that once optimization/learning module 22 trains the AI/ML algorithm, the need for extensive processing power to predict the common paths of UEs within the coverage area will be significantly decreased. Moreover, once the AI/ML algorithm is trained, the resulting most commonly taken paths can be captured as stand-alone algorithms that require less processing power, and the stand-alone algorithms can be passed to nodes 120 or to other intervening processing centers, as needed or desired. In this way, the utilization of processing resources throughout data communication network 100 may be improved, and the bandwidth utilization between cluster controller 110 and nodes 120 may be reduced.

In another embodiment, cluster controller 110 operates to evaluate the energy usage of data communication network 100, and particularly of nodes 120, and then manages the hand offs of UEs within the RF coverage area to minimize the energy consumed by the data communication network. For example, optimization/learning module 228 may operate to learn from the imaging information provided by imaging devices 130 that the usage patterns within the RF coverage area are highly dependent upon the time of day and the day of the week. Cluster controller 110 operates to allocate lower bandwidth to nodes 120 at identified times of lower usage, saving radio energy by reducing the number of RF channels or switching off unused nodes, and freeing up the processing resources of data communication network 100 for other tasks, such as for daily data back-ups or the like.

FIG. 5 further illustrates several exemplary UEs (UE1-UE4) and their respective trajectories through the RF coverage area of data communication network 100. UE1 represents a pedestrian traversing a sidewalk. Because a pedestrian's trajectory on a sidewalk is typically a straight-line path, cluster controller 110 operates to anticipate the path of UE1 based upon the learning as described above, and sets a hand off location (L1) for UE1 based upon the learned algorithm. The precise location of hand off location (L1) may be determined based upon the speed of the pedestrian (for example walking, running, etc.). Further, because the bounds of the sidewalk are known from the image data and the learned behavior of pedestrians, cluster controller 110 redirects the beamforming settings to node 120 to remain within the sidewalk.

UE2 represents a vehicle traversing a road. Because a vehicle's trajectory on a road is typically a straight-line path, cluster controller 110 operates to anticipate the path of UE2 based upon the learning as described above, and sets a hand off location (L2) for UE2 based upon the learned algorithm. The hand off location (L2) will generally be sooner than the hand off location (L1) for UE1 because a vehicle's speed will typically be greater than a pedestrian's speed. However based upon the image data, cluster controller 110 may determine that the vehicle traffic on the road is actually slower than the pedestrian traffic on the sidewalk, for example, due to it being a time associated with a "rush hour" on the road. The hand off location (L2) associated with UE2 may actually be later than the hand off location (L1) associated with UE1. Also, as noted above, the precise location of hand off location (L2) may be determined based upon the speed of the vehicle, and the bounds of the road are known from the image data and the learned behavior of pedestrians.

In a particular embodiment, the image information from imaging devices 130 may be utilized advantageously to anticipate changes in the trajectory of UEs within the RF coverage area of data communication network 100. For example, UE3 represents a pedestrian traversing the sidewalk. Thus cluster controller 110 operates to anticipate the path of UE3 based upon the learning as described above, and would typically set a hand off location (L1) for UE3 based upon the learned algorithm. However based upon the image information from imaging devices 130, cluster controller 110 operates to detect that the pedestrian has diverted from the sidewalk to enter an alley. In this case, cluster controller 110 provides a modified hand off location (L3) that accounts for the new path through the alley. The trajectories of pedestrians and vehicles through the alley may be learned as described above, and so the change to hand off location (L3) may be accompanied by the utilization of a different algorithm for the beamforming settings that is optimized for motion through the alley. In another example, UE4 represents a bus traversing the road and that turns into the alley. The bus may include multiple UEs. As such, based upon a combination of the image information and the knowledge that multiple UEs are traveling within the bus, cluster controller 110 operates to provide an earlier hand off location (L4) for UE4.

Figure 3:
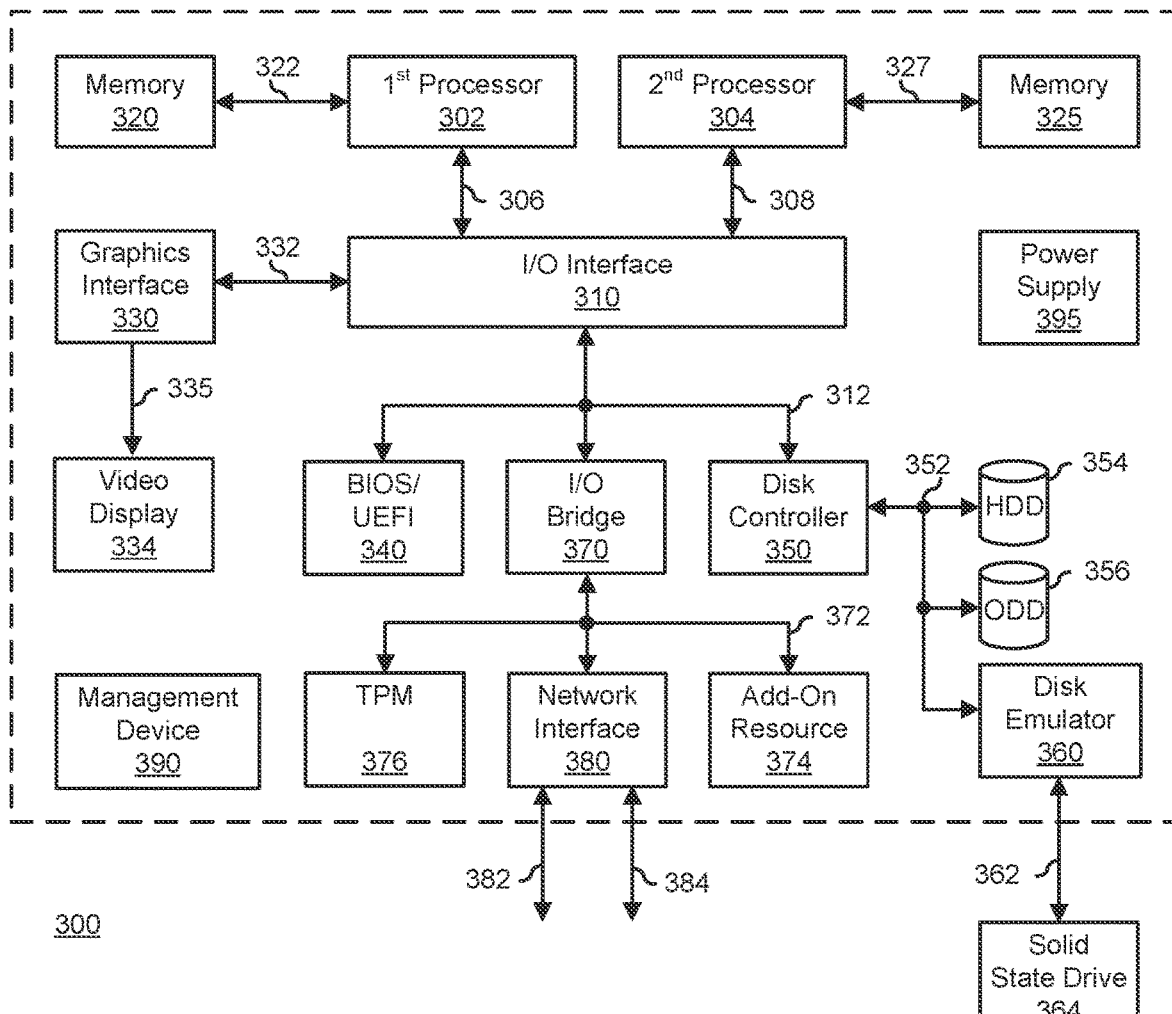
FIG. 3 is a block diagram illustrating a generalized information handling system according to another embodiment of the present disclosure.

FIG. 3 illustrates a generalized embodiment of an information handling system 300. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 364, an I/O bridge 370, one or more add-on resources 374, a trusted platform module (TPM) 376, a network interface 380, a management device 390, and a power supply 395. Processors 302 and 304, I/O interface 310, memories 320 and 325, graphics interface 330, BIOS/UEFI module 340, disk controller 350, HDD 354, ODD 356, disk emulator 360, SSD364, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 335 to a video display 334. In a particular embodiment, information handling system 300 includes separate memories that are dedicated to each of processors 302 and 304 via separate memory interfaces. An example of memories 320 and 325 includes random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 when the information handling system is otherwise shut down. An example of management device 390 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A data communication network, comprising:
   a plurality of data communication nodes configured to establish data connections with user equipment devices within a radio frequency (RF) coverage area;
   a plurality of imaging devices configured to provide image information for the RF coverage area; and
   an information handling system configured to:
      receive RF coverage information from the data communication nodes;
      receive first image information from the imaging devices;
      determine a first RF coverage map for the RF coverage area based upon the RF coverage information and the image information;
      provide a first bandwidth allocation to the data communication nodes based on the first RF coverage map;
      receive second image information from the imaging devices;
      determine that the first RF coverage map has changed to a second RF coverage map based upon a difference between the first image information and the second image information; and provide a second bandwidth allocation to the data communication nodes based on the second RF coverage map.

2. The data communication network of claim 1, wherein the first RF coverage map includes a first three-dimensional (3D) map of the RF coverage area.

3. The data communication network of claim 1, wherein the first RF coverage map includes a first physical feature.

4. The data communication network of claim 3, wherein the second RF coverage map includes a second physical feature not included in the first RF coverage map.

5. The data communication network of claim 3, wherein the first RF coverage map includes a second physical feature and the second RF coverage map does not include the second physical feature.

6. The data communication network of claim 1, wherein the information handling system is further configured to:
receive third image information from the imaging devices; and
determine a pattern in the number of user equipment devices in the RF coverage area based on the third image information.

7. The data communication network of claim 6, wherein the information handling system is further configured to provide a third bandwidth allocation to the data communication nodes based on the pattern.

8. The data communication network of claim 7, wherein the third bandwidth allocation is greater than the first bandwidth allocation when the pattern indicates that the number of user equipment devices increases.

9. The data communication network of claim 7, wherein the third bandwidth allocation is less than the first bandwidth allocation when the pattern indicates that the number of user equipment devices decreases.

10. The data communication network of claim 1, wherein the information handling system is further configured to provide a recommendation to add a data communication node to the data communication network based on the second RF coverage map.

11. A method, comprising:
providing, in a data communication network, a plurality of data communication nodes configured to establish data connections with user equipment devices within a radio frequency (RF) coverage area;
providing a plurality of imaging devices configured to provide image information for the RF coverage area;
receiving RF coverage information from the data communication nodes;
receiving first image information from the imaging devices;
determining a first RF coverage map for the RF coverage area based upon the RF coverage information and the image information;
providing a first bandwidth allocation to the data communication nodes based on the first RF coverage map;
receiving second image information from the imaging devices;
determining that the first RF coverage map has changed to a second RF coverage map based upon a difference between the first image information and the second image information; and
providing a second bandwidth allocation to the data communication nodes based on the second RF coverage map.

12. The method of claim 11, wherein the first RF coverage map includes a first three-dimensional (3D) map of the RF coverage area.

13. The method of claim 11, wherein the first RF coverage map includes a first physical feature.

14. The method of claim 13, wherein the second RF coverage map includes a second physical feature not included in the first RF coverage map.

15. The method of claim 13, wherein the first RF coverage map includes a second physical feature and the second RF coverage map does not include the second physical feature.

16. The method of claim 11, further comprising:
receiving third image information from the imaging devices; and
determining a pattern in the number of user equipment devices in the RF coverage area based on the third image information.

17. The method of claim 16, further comprising providing a third bandwidth allocation to the data communication nodes based on the pattern.

18. The method of claim 17, wherein the third bandwidth allocation is greater than the first bandwidth allocation when the pattern indicates that the number of user equipment devices increases.

19. The method of claim 17, wherein the third bandwidth allocation is less than the first bandwidth allocation when the pattern indicates that the number of user equipment devices decreases.

20. An information handling system, comprising:
a memory device for storing code; and
a processor configured to execute the code to:
receive radio frequency (RF) coverage information from a plurality of data communication nodes configured to establish data connections with user equipment devices within an RF coverage area;
receive first image information from a plurality of imaging devices configured to provide image information for the RF coverage area;
determine a first RF coverage map for the RF coverage area based upon the RF coverage information and the image information;
provide a first bandwidth allocation to the data communication nodes based on the first RF coverage map;
determine that the first RF coverage map has changed to a second RF coverage map based upon a difference between the first image information and second image information; and
provide a second bandwidth allocation to the data communication nodes based on the second RF coverage map.

* * * * *